United States Patent Office 3,123,560
Patented Mar. 3, 1964

3,123,560
GREASE COMPOSITION
Dennis F. Hallowell, Jr., Fullerton, Calif., assignor to Richfield Oil Corporation, Los Angeles, Calif., a corporation of Delaware
No Drawing. Filed Apr. 29, 1959, Ser. No. 809,599
2 Claims. (Cl. 252—28)

This invention relates to a pyrogenic silica thickened synthetic grease exhibiting desirable characteristics at high temperatures.

In the development of synthetic high temperature grease several inorganic gelling agents have been examined in conjunction with petroleum base oils. Attapulgus clay and Bentone 34, reaction products of montmorillonite clay and dodecylamine, and a processed silica gelling agent, offered by the Du Pont Company, were dispersed in a conventionally treated western pale oil of a 300 Saybolt Universal seconds viscosity at 100° F. with suitable dispersants. These products were tested at an expected operating temperature of 750° F. and in all cases the test product failed. These same three gelling agents were also examined in a fluid of known high temperature qualities, i.e., halogenated phenyls. In all cases, attempts to effect gelling of the fluid were unsuccessful even though there were used a number of materials known to be effective dispersants in systems involving the above-mentioned gelling agents and petroleum oils.

The use of pyrogenic silica as a thickener for mineral lubricating oils has been suggested in "NLGI Spokesman" (Journal of the National Lubricating Grease Institute), page 230, August 1958. However, the pyrogenic silica is generally not effective as a gelling agent or thickener in petroleum oils unless a dispersant such as sorbitan mono oleate is added to the composition.

In addition, when petroleum base oils are thickened with pyrogenic silica, a water repellent additive, such as a diester, is required.

Therefore, it is the object of my invention to provide a pyrogenic silica thickened grease which does not require a dispersant.

The present invention is based upon the discovery that the use of pyrogenic silica as a thickener for a synthetic oil provides a grease composition exhibiting desirable high temperature characteristics. Furthermore, when pyrogenic silica is employed for this purpose gelling can be effected without the addition of any extraneous dispersants after milling.

The grease compositions of the present invention can be prepared by following conventional procedures, e.g., dispersion of a synthetic oil base, generally a halogenated, preferably chlorinated, phenyl but usually a chlorinated diphenyl synthetic oil of lubricating viscosity, and pyrogenic silica. Although the amounts of these components will depend upon the properties desired in the finished grease, generally at least about 80 weight percent and preferably from about 90–98 weight percent of the synthetic oil is employed in conjunction with a sufficient amount of the pyrogenic silica to provide a composition of grease consistency, generally from about 1 to 20, preferably about 2 to 10 weight percent. Although various optional additives in addition to the essential components can also be incorporated in my novel compositions to enhance the mechanical stability and water tolerance properties of my composition I prefer to incorporate Metasap 248, identified as monostearoyl tetraethylene-pentamine silicate, a siliceous amine product of the Nopco Chemical Company, obtained by reacting an excess of sodium silicate ($Na_2O:3.22SiO_2$) in water solution with an acetate salt of a hydrogenated tallow fatty acids, monamide (produced by reaction of tetraethylene pentamine with the tallow acids and subsequent addition of glacial acetic acid) at 70–80° C., adding hydrochloric acid to a pH of about 7.8, filtering, water-washing and drying.

The Metasap 248 can be employed in ratios to the pyrogenic silica to provide grease compositions with a wide range of penetrations and usually from 0.25 to 20, preferably about 0.5 to 10, weight percent of this ingredient is employed.

The pyrogenic silicas employed in the grease compositions of the present invention are described in "NLGI Spokesman" (Journal of the National Lubricating Grease Institute) page 230, August 1958. They include Cab-O-Sil, a pyrogenic silica supplied by the Cabot Company, and are prepared by hydrolyzing a silicon halide in the vapor phase, e.g., reaction of water vapor produced by burning $H_2$ at 2000° F. with silicon tetrachloride. Pyrogenic silica as distinguished from precipitated silica, differs in several properties over the latter, e.g., porosity, surface nature, and ease of dispersion. For instance, pyrogenic particles are much smaller and non-porous with almost all the surface area shown by the $N_2$ absorption method as "external," about 50% of its surface is covered with OH groups; and they are easier to disperse in a hydrophobic medium.

The invention may be further illustrated with reference to the following specific examples:

Composition A set forth in Table I, was prepared according to conventionally grease making practice by dispersing 4 parts by weight of Cab-O-Sil and 96 parts by weight of base fluid consisting of Arochlor 1254. Gelling took place without the addition of any extraneous dispersants after milling in a charlotte colloid mill at 180° F. at a rotor-stator clearance of .001 of an inch.

Composition B, set forth in Table II, was prepared by dispersing 3 parts by weight of Cab-O-Sil and 2 parts by weight of Metasap 248 in 95 parts by weight of base fluid blend including 35 weight percent of Arochlor 1248 and 65 weight percent of Arochlor 1254. Gelling took place without the addition of any extraneous dispersants after milling by the same process as Composition A.

The physical characteristics of Arochlors 1248 and 1254 (chlorinated diphenyls) are presented in Table III and the physical characteristics of Cab-O-Sil (a pyrogenic silica) are presented in Table IV. Arochlors suitable for use in the compositions of the present invention include, for instance, the mono-, di-, tri- and tetra-chlorodiphenyls with a specific gravity at 25° C. of generally from about 1.2 to 1.6.

TABLE I.—COMPOSITION A

Composition of Synthetic High Temperature Grease

| Composition: | Percent |
|---|---|
| Base fluid (by volume)—Arochlor 1254 | 100 |
| Composition (by weight)— | |
| Base fluid | 96 |
| Cab-O-Sil | 4 |

| | Typical tests |
|---|---|
| Penetration unworked @ 77° F | 245 |
| ASTM penetration @ 77° F | 244 |
| ASTM dropping point, ° F | 500 |
| Bleeding (AAR, 24 hours @ 210° F.) | Nil |

TABLE I—Continued

| | |
|---|---|
| Corrosion (24 hrs. @ room temp.): | Typical tests |
| Copper | Nil |
| Steel | Nil |
| Mechanical stability: | |
| Worked 60 strokes | 244 |
| Worked 5,000 strokes | 288 |
| Worked 10,000 strokes | 294 |
| Worked 100,000 strokes | 316 |

TABLE II.—COMPOSITION B

*Composition of Synthetic High Temperature Grease*

| Composition: | Percent |
|---|---|
| Base fluid (by volume)— | |
| Arochlor 1248 | 35 |
| Archlor 1254 | 65 |
| Composition (by weight)— | |
| Base fluid | 95 |
| Cab-O-Sil | 3 |
| Metasap 248 | 2 |
| | Typical tests |
| Penetration unworked at 77° F | 272 |
| ASTM penetration at 77° F | 272 |
| ASTM dropping point, ° F | 500 |
| Bleeding (AAR, 24 hrs. at 210° F.) | Nil |
| Corrosion (24 hrs. at 250° F.: | |
| Copper | Nil |
| Steel | Nil |
| Water absorption, percent | 100 |
| Shell roll stability, 24 hours | 270 |
| Timken E.P. test, max. load, lbs | 40 |

TABLE III

*Physical Characteristics of Arochlors*

CHLORINATED DIPHENYLS

| | Arochlor 1248 | Arochlor 1254 |
|---|---|---|
| Distillation range, ° C | 340–375 | 365–390 |
| Evaporation Loss, Percent ASTM D-6 Mod., 163° C.—5 hours | 3.0–4.0 | 1.1–1.3 |
| Flash, ° F., COC | 379–384 | None |
| Fire, ° F., COC | None | None |
| Pour Point, ° F | −7 | 10 |
| Refractive Index—D-line—20° C | 1.630–1.631 | 1.639–1.641 |
| Viscosity at 100° F., SUS | 185–240 | 1,800–2,500 |
| Viscosity at 210° F., SUS | 36–37 | 44–48 |
| Specific Gravity, 25°/25° C | 1.445 | 1.538 |
| Average Coeff. of Expansion cc./cc./° C | 0.00070 | 0.00066 |

TABLE IV

*Physical Characteristics of Cab-O-Sil*

| | | |
|---|---|---|
| Silica content | percent | 99.0–99.7 |
| Free moisture at 105° C | do | 0.2–1.5 |
| Ignition loss at 1000° C | do | 0.2–1.0 |
| CaO, Mgo, Na$_2$O | do | 0.00 |
| Fe$_2$O$_3$+Al$_2$O$_3$ | do | 0.01 |
| Particle size range | microns | 0.015–0.020 |
| Surface area (nitrogen adsorption) | sq. meters/gram | 175–200 |
| Specific gravity | | 2.1 |
| Color | | White |
| Refractive index | | 1.55 |
| pH (4% aqueous suspension) | | 3.5–4.0 |

The above data show the advantageous physical characteristics of the greases of the present invention. For instance, these greases show a high dropping point (500° F.+), exceptional anti-bleeding properties (nil) and good mechanical stability.

Although my invention has been described with a certain degree of particularity, it is to be understood that I do not wish to be limited to the details set forth, but my invention is to be given the full scope of the appended claims.

I claim:
1. A synthetic grease composition consisting essentially of a halogenated diphenyl of lubricating viscosity as the base oil, about 2 to 10 weight percent pyrogenic silica, and from about 0.5 to 10 weight percent of monostearoyl tetraethylene pentamine silicate.

2. A process for lubricating metal surfaces comprising the step of: coating at least one of said metal surfaces with the grease of claim 1.

References Cited in the file of this patent

UNITED STATES PATENTS

| | | |
|---|---|---|
| 2,274,674 | Earle | Mar. 3, 1942 |
| 2,629,691 | Peterson | Feb. 24, 1953 |
| 2,642,397 | Morway et al. | June 16, 1953 |
| 2,648,633 | Peterson et al. | Aug. 11, 1953 |
| 2,681,314 | Skinner et al. | June 15, 1954 |
| 2,748,081 | Peterson et al. | May 29, 1956 |
| 2,898,295 | MacKenzie | Aug. 4, 1959 |

FOREIGN PATENTS

| | | |
|---|---|---|
| 215,120 | Australia | May 26, 1958 |